Aug. 10, 1937.  M. E. RUTHERFORD  2,089,431
CRADLE SPRING SUPPORT
Filed May 18, 1936
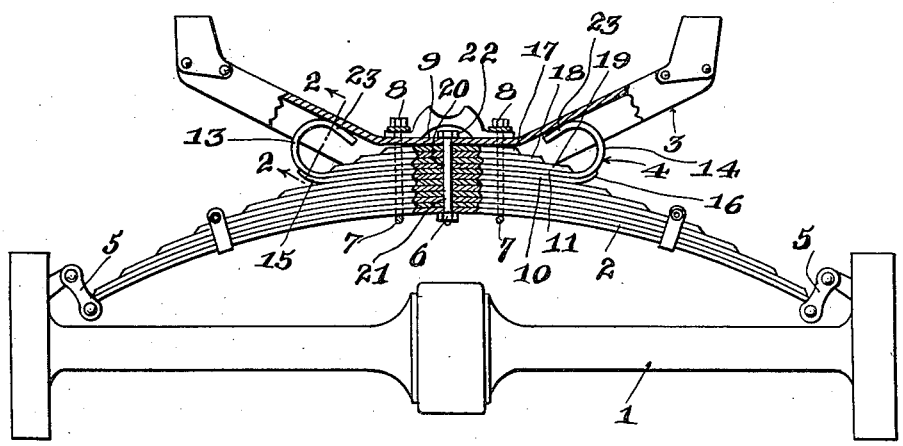
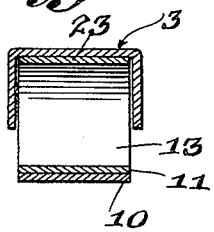
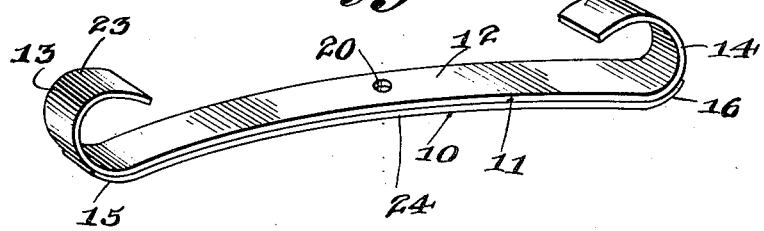
Inventor
Marvin E. Rutherford
By Kimmel & Crowell
Attorney Patented Aug. 10, 1937

2,089,431

UNITED STATES PATENT OFFICE 2,089,431

CRADLE-SPRING SUPPORT

Marvin E. Rutherford, Abilene, Tex., assignor to Claude W. Gill, Abilene, Tex.

Application May 18, 1936, Serial No. 80,443

1 Claim. (Cl. 267—45)

My invention relates to a cradle-spring support for the cross members or braces of automotive vehicles, and is an improvement upon the support forming the subject of Letters Patent No. 1,519,935 granted to me December 16, 1924.

The support as disclosed by the Letters Patent aforesaid could only be employed with the front cross member or brace and front spring of the old type model T Ford car and is not adaptable for present type cars. It is the aim of this invention to provide, in a manner as hereinafter set forth, a cradle-spring support which is not only capable of being used in connection with present type cars, but also with the front and rear cross members and springs of such cars and acting when in use to sustain the weight of the load from the ends of the cradle-support when the car is loaded and travelling over an uneven road surface, thereby relieving the connection between the vehicle's spring, the support and the cross members from the weight of the load.

A further object of the invention is to provide, in a manner as hereinafter set forth, a cradle-spring support, which when used, eliminates spring and cross member breakage and further acts as an overload spring.

A further object of the invention is to provide, in a manner as hereinafter set forth, a cradle-spring support which, when used, acts to take out side-sways that are caused by high speed travelling and on turns, as well as further improving the riding comfort and steering of the car and assisting to hold the vehicle spring in proper arch.

A further object of the invention is to provide, in a manner as hereinafter set forth, a cradle-spring support capable of being used in the present type cars and trucks that are employed for hard work and acting to take out the flexibility of so much of the vehicle spring as to increase the life of the latter when it is subjected to hard uses.

A further object of the invention is to provide, in a manner as hereinafter set forth, a cradle-spring support which, when used, acts to hold the front of the frame of the car rigid to eliminate wheel shimmying, radiator trouble and breaking down of the frame.

The cradle-spring support, in accordance with this invention, not only embodies the objects as set forth in the patent aforesaid, but has for its further objects to provide a yieldable spring-cradle support which is simple in its construction and arrangement, strong, durable, compact, thoroughly efficient in its use, readily installed, and comparatively inexpensive to manufacture.

With the foregoing and other objects in view, the invention consists of the novel construction, combination and arrangement of parts as will be more specifically described and as are illustrated in the accompanying drawing wherein is shown an embodiment of the invention, but it is to be understood that changes, variations and modifications may be resorted to which fall within the scope of the claim hereto appended.

In the drawing:

Figure 1 is a front elevation of a cross member and a vehicle spring showing the adaptation therewith of a yieldable cradle-spring support in accordance with this invention, the cross member, vehicle spring and support being shown partly in section, Figure 2 is a section on line 2—2, Figure 1, and Figure 3 is a perspective view of the lower elements of the yieldable cradle-spring support.

Referring to the drawing, 1 denotes an axle of an automotive vehicle which is shown by way of example as the rear axle, 2 the rear vehicle spring and 3 the rear cross member or brace of the vehicle. Interposed between the spring 2 and cross member 3 is a yieldable cradle-spring support 4 in accordance with my invention.

The vehicle spring 2 is connected with the axle body 1 by the pivotal connections 5. The spring 2, cross member 3 and cradle-spring support 4 are connected by a tie bolt 6 and a pair of spring clips 7 together. The arms of the spring clips 7 carry securing means 8. The cross member 3 is of inverted arch shape and the body of said member 3 is of inverted channel shape. As shown the cross member 3 has a flat central portion 9.

The vehicle spring 2 is of the laminated type, and when the support is interposed between the spring 2 and cross member 3, the two upper leaves of the spring 2 are removed and the elements of the support 4 act as a substitute for the leaves of spring 2 which have been removed.

The cradle-spring support is of the laminated type and includes a lower resilient base member 10 of compound curvature, a resilient bearing member 11 mounted on member 10 and formed of an intermediate stretch 12 of arcuate form and a pair of oppositely extending, upstanding, inwardly curved end stretches 13, 14. The member 11 is of greater length than the member 10. The latter has oppositely disposed upturned curved end portions 15, 16 which snugly bear against the lower portions of the end portions 13, 14 of the member 11. The element 4 also includes an upstanding central support for and of a height to extend into the central portion of the cross member 3. The said central support consists of a set of superimposed resilient members of arcuate form and the number of members of the set may be as desired, preferably three and are indicated at 17, 18 and 19. The length of the support is less than the length of the base member or the bearing member. The members of said set gradually increase in length from the upper one of said members to the lower one of said members. The member 19, which is the lower member of the set is seated upon the stretch 12 of member 11 and has its ends spaced from the upturned end stretches 13, 14. Each of the members of the structure 4 has a centrally arranged opening. The openings 20 of the members of structure 4 register with each other. The bolt 6 extends through said registering openings and also through the registering openings 21 in the laminations of the spring and also an opening 22 in the flat part 9 of the cross member 3.

The upturned end stretches 13, 14 extend the top of and are directed inwardly to overhang the side portions of the central support. The said end stretches 13, 14 extend into the body of the cross member 3 and bear against the inner face of the top of the cross member 3. The member 17 opposes the portion 9 of the cross member 3. The upturned portions 13, 14 of the member 11 provide a pair of bearing surfaces 23.

The members 17, 18 and 19 of the support 4 conform in contour to the shape of the leaves of the spring 2. The intermediate stretch 12 of the member 11 and the intermediate stretch 24 of the member 10 conform in contour to the shape of the leaves of the spring 2. The member 10 is employed to protect the spring 2 as well as having its end portions 15, 16 provide resilient bearings for the inturned curved end portions 13, 14 of the member 11.

The cradle-spring support is of a length to extend up into the cross member 3 whereby sidewise movement of the cradle-spring support relative to the cross member 3 is prevented, under such conditions reducing to a minimum the possibility of breaking of the bolt 6.

The upturned end stretches 13, 14 of the member 11 provide means for supporting cross member 3 and also means for sustaining the load so that the tie bolt connection will be relieved therefrom and further to set up a cushioning function when the vehicle is travelling over uneven road surface. The portion 9 of the cross member 3 may cant the upper member 17 of the support 4. In this connection it will be stated that portion 9 of cross member 3 is flat whereas member 17 of support 4 is of arcuate contour.

As the vehicle becomes overloaded and the spring 2 flattens out, the cradle-spring support equalizes and distributes the weight through the entire length of the spring or otherwise the weight would be in the center of the spring.

What I claim is:

A cradle-spring support adapted to be secured to and for interposition between a cross member or brace and a laminated spring of a vehicle, said cradle-spring support formed of a resilient base member for superimposing on the top of the vehicle spring, a resilient bearing member superimposed on and of greater length than said base member and formed with upstanding oppositely curved end stretches extending inwardly at their upper ends and providing spaced bearings for the cross member, a central support for the central portion of the cross member said central support formed of a set of superimposed resilient members, said central support being mounted in superimposed relation upon said bearing member between the end stretches of the latter, the said end stretches extending above and overhanging the side portions of the central support, the members of said central support progressively decreasing in length upwardly, the members of said central support and the intermediate portions of the base and bearing members conforming in curvature to that of the vehicle spring and providing an upward continuation of the latter.

MARVIN E. RUTHERFORD.